(12) United States Patent
Malloy et al.

(10) Patent No.: US 8,126,871 B2
(45) Date of Patent: *Feb. 28, 2012

(54) SYSTEMS AND COMPUTER PROGRAM PRODUCTS TO IDENTIFY RELATED DATA IN A MULTIDIMENSIONAL DATABASE

(75) Inventors: William Earl Malloy, Santa Clara, CA (US); Ken Qian Pu, Mississauga, CA (US)

(73) Assignee: International Business Machines Corporation, Armonk, NY (US)

(*) Notice: Subject to any disclaimer, the term of this patent is extended or adjusted under 35 U.S.C. 154(b) by 531 days.

This patent is subject to a terminal disclaimer.

(21) Appl. No.: 12/264,891

(22) Filed: Nov. 4, 2008

(65) Prior Publication Data
US 2009/0063403 A1 Mar. 5, 2009

Related U.S. Application Data

(63) Continuation of application No. 10/325,299, filed on Dec. 18, 2002, now Pat. No. 7,472,127.

(51) Int. Cl.
*G06F 7/00* (2006.01)
*G06F 17/30* (2006.01)

(52) U.S. Cl. ........ 707/717; 707/830; 707/957; 707/958; 707/E17.002; 707/E17.056

(58) Field of Classification Search .................. 707/717, 707/830, 957, 958, E17.002, E17.056
See application file for complete search history.

(56) References Cited

U.S. PATENT DOCUMENTS

| 5,231,577 A | 7/1993 | Koss |
| 5,233,513 A | 8/1993 | Doyle |
| 5,325,445 A | 6/1994 | Herbert et al. |
| 5,359,724 A | 10/1994 | Earle |

(Continued)

FOREIGN PATENT DOCUMENTS

JP 8263566 10/1996

(Continued)

OTHER PUBLICATIONS

Sanjay Goil and Alok Choudhary—"Design and Implementation of a Scalable Parallel System for Multidimensional Analysis and OLAP"—Parallel and Distributed Processing, 1999—13$^{th}$ International and 10$^{th}$ Symposium on Parallel and Distributed Processing, Apr. 12-16, 1999 (pp. 576-581).*

(Continued)

*Primary Examiner* — John E Breene
*Assistant Examiner* — Anh Ly
(74) *Attorney, Agent, or Firm* — Janaki K. Davda; Konrad Raynes & Victor LLP

(57) ABSTRACT

Systems and computer program products that identify data that is related to and associated with data that has been selected from a multidimensional database. The overwhelming amount of data in a multidimensional database that may be viewed by a user, such as a data analyst, is reduced to the selected and associated data by use of index data and related index data, according to the present invention. The views of selected data and related data may be highlighted and formatted for presentation to the user. Further, irrelevant data is filtered out and not presented to the user. Existing systems have not been able to efficiently and adequately identify data that is related to and associated with selected data in a multidimensional database.

6 Claims, 4 Drawing Sheets

U.S. PATENT DOCUMENTS

| | | | |
|---|---|---|---|
| 5,371,675 | A | 12/1994 | Greif et al. |
| 5,418,898 | A | 5/1995 | Zand et al. |
| 5,647,058 | A | 7/1997 | Agrawal et al. |
| 5,680,618 | A | 10/1997 | Freund |
| 5,721,910 | A | 2/1998 | Unger et al. |
| 5,727,199 | A | 3/1998 | Chen et al. |
| 5,778,354 | A | 7/1998 | Leslie et al. |
| 5,778,355 | A | 7/1998 | Boyer et al. |
| 5,805,885 | A | 9/1998 | Leach et al. |
| 5,819,270 | A | 10/1998 | Malone et al. |
| 5,864,857 | A | 1/1999 | Ohata et al. |
| 5,890,151 | A | 3/1999 | Agrawal et al. |
| 5,905,985 | A | 5/1999 | Malloy et al. |
| 5,918,210 | A | 6/1999 | Rosenthal et al. |
| 5,918,232 | A * | 6/1999 | Pouschine et al. ...... 707/999.003 |
| 5,926,818 | A | 7/1999 | Malloy |
| 5,926,820 | A | 7/1999 | Agrawal et al. |
| 5,933,796 | A | 8/1999 | Ashida et al. |
| 5,940,818 | A | 8/1999 | Malloy et al. |
| 5,943,668 | A | 8/1999 | Malloy et al. |
| 5,943,677 | A | 8/1999 | Hicks et al. |
| 5,953,707 | A | 9/1999 | Huang et al. |
| 5,970,482 | A | 10/1999 | Pham et al. |
| 5,978,788 | A | 11/1999 | Castelli et al. |
| 5,978,796 | A * | 11/1999 | Malloy et al. ............... 707/999.1 |
| 5,995,945 | A | 11/1999 | Notani et al. |
| 6,003,029 | A | 12/1999 | Agrawal et al. |
| 6,003,036 | A | 12/1999 | Martin |
| 6,011,910 | A | 1/2000 | Chau et al. |
| 6,065,002 | A | 5/2000 | Knotts et al. |
| 6,078,741 | A | 6/2000 | Ma et al. |
| 6,094,651 | A | 7/2000 | Agrawal et al. |
| 6,108,647 | A | 8/2000 | Poosala et al. |
| 6,122,636 | A | 9/2000 | Malloy et al. |
| 6,134,541 | A | 10/2000 | Castelli et al. |
| 6,134,563 | A | 10/2000 | Clancey et al. |
| 6,148,295 | A | 11/2000 | Megiddo et al. |
| 6,154,746 | A | 11/2000 | Berchtold et al. |
| 6,167,396 | A | 12/2000 | Lokken |
| 6,182,060 | B1 | 1/2001 | Hedgcock et al. |
| 6,205,447 | B1 | 3/2001 | Malloy et al. |
| 6,212,515 | B1 | 4/2001 | Rogers |
| 6,212,524 | B1 | 4/2001 | Weissman et al. |
| 6,219,665 | B1 | 4/2001 | Shiomi |
| 6,278,994 | B1 | 8/2001 | Fuh et al. |
| 6,285,996 | B1 | 9/2001 | Jou et al. |
| 6,289,354 | B1 | 9/2001 | Aggarwal et al. |
| 6,317,750 | B1 | 11/2001 | Tortolani et al. |
| 6,366,299 | B1 | 4/2002 | Lanning et al. |
| 6,381,605 | B1 | 4/2002 | Kothuri et al. |
| 6,385,604 | B1 | 5/2002 | Bakalash et al. |
| 6,408,300 | B1 | 6/2002 | Bergman et al. |
| 6,411,313 | B1 | 6/2002 | Conlon et al. |
| 6,438,537 | B1 | 8/2002 | Netz et al. |
| 6,456,949 | B1 | 9/2002 | Yamagajo et al. |
| 6,460,026 | B1 | 10/2002 | Pasumansky |
| 6,480,842 | B1 | 11/2002 | Agassi et al. |
| 6,484,179 | B1 * | 11/2002 | Roccaforte ................ 707/999.1 |
| 6,490,593 | B2 | 12/2002 | Proctor |
| 6,535,872 | B1 | 3/2003 | Castelli et al. |
| 6,542,895 | B1 | 4/2003 | DeKimpe et al. |
| 6,567,796 | B1 | 5/2003 | Yost et al. |
| 6,578,022 | B1 | 6/2003 | Foulger et al. |
| 6,581,068 | B1 * | 6/2003 | Bensoussan et al. ...... 707/999.1 |
| 6,654,764 | B2 | 11/2003 | Kelkar et al. |
| 6,691,098 | B1 | 2/2004 | Agrawal et al. |
| 6,707,454 | B1 | 3/2004 | Barg et al. |
| 6,714,940 | B2 | 3/2004 | Kelkar |
| 6,735,590 | B1 | 5/2004 | Shoup et al. |
| 6,741,983 | B1 | 5/2004 | Birdwell et al. |
| 6,754,654 | B1 * | 6/2004 | Kim et al. ..................... 707/749 |
| 6,778,996 | B2 * | 8/2004 | Roccaforte .................. 707/600 |
| 6,915,289 | B1 | 7/2005 | Malloy et al. |
| 7,076,502 | B2 | 7/2006 | Shoup et al. |
| 7,076,742 | B1 | 7/2006 | Thorn et al. |
| 7,181,450 | B2 | 2/2007 | Malloy et al. |
| 7,191,169 | B1 * | 3/2007 | Tao ............................... 707/714 |
| 7,269,786 | B1 | 9/2007 | Malloy et al. |
| 7,315,849 | B2 | 1/2008 | Bakalash et al. |
| 2001/0047364 | A1 | 11/2001 | Proctor |
| 2001/0054034 | A1 | 12/2001 | Arning et al. |
| 2002/0029207 | A1 | 3/2002 | Bakalash et al. |
| 2002/0099710 | A1 | 7/2002 | Papierniak |
| 2002/0116213 | A1 | 8/2002 | Kavounis et al. |
| 2002/0149614 | A1 | 10/2002 | Biebesheimer et al. |
| 2002/0184187 | A1 | 12/2002 | Bakalash et al. |
| 2002/0198919 | A1 | 12/2002 | Kelkar |
| 2003/0009649 | A1 | 1/2003 | Martin et al. |
| 2003/0014417 | A1 | 1/2003 | Kelkar |
| 2003/0028546 | A1 | 2/2003 | Keller et al. |
| 2003/0126143 | A1 | 7/2003 | Roussopoulos et al. |
| 2003/0208506 | A1 | 11/2003 | Greenfield et al. |
| 2003/0225752 | A1 | 12/2003 | Bakalash et al. |
| 2004/0034615 | A1 | 2/2004 | Thomson et al. |
| 2004/0059724 | A1 | 3/2004 | Petculescu et al. |
| 2004/0243607 | A1 | 12/2004 | Tummalapalli |
| 2005/0010579 | A1 | 1/2005 | Shoup et al. |
| 2006/0085742 | A1 | 4/2006 | Harold et al. |

FOREIGN PATENT DOCUMENTS

| | | |
|---|---|---|
| JP | 10040050 | 2/1998 |
| JP | 2001022621 | 1/2001 |
| WO | 98/47092 | 10/1998 |

OTHER PUBLICATIONS

Tapio Niemi and Jyrki Nummenmaa—"Logical Multidimensional Database design for Ragged and Unbalanced Aggregation Hierarchies"—Proceedings of the International Workshop on Design and Management of data Warehouses (DMDW '2001-Jun. 4, 2001 (pp. 1-8).*

Dimitri Theodoratos and Aris Tsois—"Heuristic Optimization of OLAP Queries in Multidimensionally Hierarchically Clustered Databases"—ACM 2001 (pp. 48-55).*

Baldwin, J.F. and T.P. Martin, "Uncertainty Handling in Real-World Applications of Data Mining", Proceedings of the 3rd International Conference on the Practical Application of Knowledge Discovery and Data Mining, Apr. 1999, pp. 1-18.

Chaudhuri, S. & U. Dayal, "An Overview of Data Warehousing and OLAP Technology", [online], Mar. 1997, [retrieved on Mar. 13, 2006], retrieved from the Internet at <URL: http://www.cs.sfu.ca/CC/459/han/papers/chaudhuri97.pdf>, 10 pp.

Chester, T. and R.H. Alden, Mastering Excel 97, Fourth Edition, Sybex Inc., 1997, pp. 6, 463-465, 495-503, 521-526, and 744-748.

Computergram International, "Information Builders Ready with Fusion Multi-Dimensional Database for Warehouseing, Executive Information Systems", n. 2917, May 21, 1996.

Connor, C. & A. Deseure, "Using OLAP in Database Marketing", Database and Network Journal, Apr. 1998, vol. 28, No. 2, pp. 6-8.

De Ville, B., "Data Mining Best Practices: Lessons Learned in Process, Applications and Techniques", Proceedings of the 3rd International Conference on the Practical Application of Knowledge Discovery and Data Mining, Apr. 1999, pp. 19-20.

Goil, S. and A. Choudhary, "A Parallel Scalable Infrastructure for OLAP and Data Mining", Proceedings of the International Database Engineering and Applications Symposium, Aug. 1999, pp. 178-186.

Goil, S. and A. Choudhary, "Sparse Data Storage of Multi-Dimensional Data for OLAP and Data Mining", Technical Report CPDC-TR-9801-005, Northwestern University, 1998, 26 pp.

Graco, W., "Some Developments in the Use of Smart Technology in Health Care and Administration", Proceedings of the 3rd International Conference on the Practical Application of Knowledge Discover and Data Mining, Apr. 1999, 10 pp.

Han, J., J. Pei, g. Dong, & K. Wang, "Efficient Computation of Iceberg Cubes with Complex Measures", Proceedings of the 2001 ACM SIGMOD International Conference on Management of Data, May 2001, vol. 30, No. 2, Jun. 2001, pp. 1-12.

Harris-Jones, C., "Integrating Data Mining into Business Intelligence", Proceedings of the 3rd International Conference on the Practical Application of Knowledge Discovery and Data Mining, Apr. 1999, pp. 21-22.

Ho, C., R. Agrawal, N. Megiddo, and R. Srikant, "Range Queries in OLAP Data Cubes", Proceedings of the 1997 ACM SIGMOD International Conference on Management of Data, 1997, pp. 73-88.

Kelkar, B., "Exploiting Symbiosis between Data Mining and OLAP for Business Insights", [online], Dec. 2001, [retrieved on Apr. 18, 2006], retrieved from the Internet at <URL: http://dmreview.com/editorial/dmreview/print_action.cfm?articleID=4446>.

Lee, D.H., C.W. Chung, & H.J. Kim, "Spherical Pyramid-Technique: An Efficient Indexing Technique for Similarity Search in High-Dimensional Data", Journal of KISS, Nov. 1999, vol. 26, No. 11, pp. 1270-1281.

Legakis, L., J. Nugent, D.G. Bowen, and J. Bowen, "Intelligent Subject Matter Classification and Retrieval", Proceedings of the 1993 Canadian Conference on Electrical and Computer Engineering, Sep. 1993, vol. I, 1-35.

Li C. & X.S. Wang, "A Data Model for Supporting On-line Analytical Processing", Proceedings of the Fifth International Conference on Information and Knowledge Management, Nov. 1996, pp. 81-88.

Lindsey, H., J.T. Mason, & T. Wilson, "Meaningful Viewing of Complex Data Structures", IBM Technical Disclosure Bulletin, Aug. 1994, vol. 37, No. 8, pp. 637-638.

Martin, J., with K.K. Chapman and J. Leben, DB2: Concepts, Design, and Programming, Prentice Hall, 1989.

"MIS AG Announces Software that Automates and Enhances Business-Intelligence Methods", [online], Aug. 18, 1998, [Retrieved on Dec. 11, 2002], retrieved from the Internet at <URL: http://www.hpcwire.com/dsstar/98/0818/100264>, 2 pp.

"Multidimensional Indexing: The R Tree", Chapter 26, Spatial Database Management, 454, pp. 1-13, Date: 2008, Nov. 4, 2008.

Oxford University Press, "Dictionary of Computing", Third Edition, 1990, 6 pp.

Pairceir, R., S. McClean, & B. Scotney, "Discovery of Multi-level Rules and Exceptions from a Distributed Database", Proceedings of the Sixth ACM SIGKDD International Conference on Knowledge Discovery and Data Mining, 2000, pp. 523-532.

PC Week, "Information Builders Erects 'Fusion'", PC Week, May 6, 1996, p. 8.

Rennhackkamp, M., "IBM's Intelligent Family: Decision Making Driven by IBM's Business Intelligence Initiative", DBMS, [online], Aug. 1998, [Retrieved on Jul. 1, 2005], retrieved from the Internet at <URL: http://www.dbmsmag.com >, 5 pp.

Richeldi, M., "A Business Intelligence Solution for Energy Budget Control", Proceedings of the 3rd International Conference on the Practical Application of Knowledge Discovery and Data Mining, Apr. 1999, pp. 167-182.

Rotem, D. & J.L. Zhao, "Extendible Arrays for Statistical Databases and OLAP Applications", Proceedings of the 8th International Conference on Scientific and Statistical Database Systems, Jun. 1996, pp. 108-117.

Sarawagi, S., "Explaining Differences in Multidimensional Aggregates", Proceedings of the 25th International Conference on Very Large Data Bases, Sep. 1999, pp. 42-53.

Sarawagi, S., "Indexing OLAP Data 0", Bulletin of the IEEE Computer Society Technical Committee on Data Engineering, 1996, pp. 1-9.

Sarawagi, S., R. Agrawal, & N. Megiddo, "Discovery-Driven Exploration of OLAP Data Cubes", Proceedings of the 6th International Conference on Extending Database Technology, Mar. 1998, pp. 168-182.

Sarawagi, S., R. Agrawal, & N. Megiddo, "Discovery-Driven Exploration of OLAP Data Cubes", Research Report, pp. 1-28.

Shanmugasundaram, J., U. Fayyad, & P.S. Bradley, "Compressed Data Cubes for OLAP Aggregate Query Approximation on Continuous Dimensions", Proceedings of the 5th ACM SIGKDD International Conference on Knowledge Discovery and Data Mining, 1999, pp. 223-232.

Sharman, R., "Improved Segmentation for Data Analysis", IBM Technical Disclosure Bulletin, vol. 40, No. 8, Aug. 1997, pp. 145-154.

Sokol, L. "Insuring the Success of Commercial Data Mining Projects", Proceedings of the 3rd International Conference on the Practical Application of Knowledge Discovery and Data Mining, Apr. 1997, pp. 23-28.

Sung, S., S. Huang, & A. Ramer, "Smoothing Over Summary Information in Data Cubes", Journal of Systems Integration, vol. 10, No. 1, Nov. 2000, pp. 5-22.

Theodoratos, D. & T. Sellis, "Answering Multidimensional Queries on Cubes Using Other Cubes", Proceedings of the 12th International Conference on Scientific and Statistical Database Management, Jul. 2000, pp. 110-122.

English Patent Abstract for JP8263566 published on Oct. 11, 1996, 1 pp.

English Patent Abstract for JP10040050 published on Feb. 13, 1998, 2 pp.

English Patent Abstract for JP2001022621 published on Jan. 26, 2001, 2 pp.

Office Action 1, Jun. 2, 2005, for U.S. Appl. No. 10/325,299, Total 13 pp.

Amendment 1, Sep. 1, 2005 for U.S. Appl. No. 10/325,299, Total 13 pp.

Office Action 2, Nov. 21, 2005, for U.S. Appl. No. 10/325,299, Total 11 pp.

Amendment 2, Feb. 21, 2006, for U.S. Appl. No. 10/325,299, Total 7 pp.

Final Office Action, May 10, 2006, for U.S. Appl. No. 10/325,299, Total 11 pp.

Amendment 3, Jul. 10, 2006, for U.S. Appl. No. 10/325,209, Total 7 pp.

Office Action 4, Jul. 21, 2006, for U.S. Appl. No. 10/325,299, Total 13 pp.

Amendment 4, Oct. 20, 2006, for U.S. Appl. No. 10/325,299, Total 8 pp.

Supplement Amendment 5, Feb. 23, 2007, for U.S. Appl. No. 10/325,299, Total 3 pp.

Office Action 5, Apr. 18, 2007, for U.S. Appl. No. 10/325,299, Total 13 pp.

Amendment 6, Jul. 17, 2007, for U.S. Appl. No. 10/325,299, Total 7 pp.

Final Office Action 2, Oct. 3, 2007, for U.S. Appl. No. 10/325,299, Total 10 pp.

Amendment 7, Dec. 5, 2007, for U.S. Appl. No. 10/325,299, Total 9 pp.

Advisory Action, Dec. 26, 2007, for U.S. Appl. No. 10/325,299, Total 3 pp.

Office Action 7, Feb. 22, 2008, for U.S. Appl. No. 10/325,299, Total 14 pp.

Amendment 8, May 21, 2008, for U.S. Appl. No. 10/325,299, Total 8 pp.

Notice of Allowance 1, Jul. 31, 2008, for U.S. Appl. No. 10/325,299, Total 12 pp.

Preliminary Amendment, Mar. 25, 2003, for U.S. Appl. No. 10/325,299, Total 4 pp.

Supplemental Amendment 5, May 22, 2008, for U.S. Appl. No. 10/325,299, Total 5 pp.

* cited by examiner

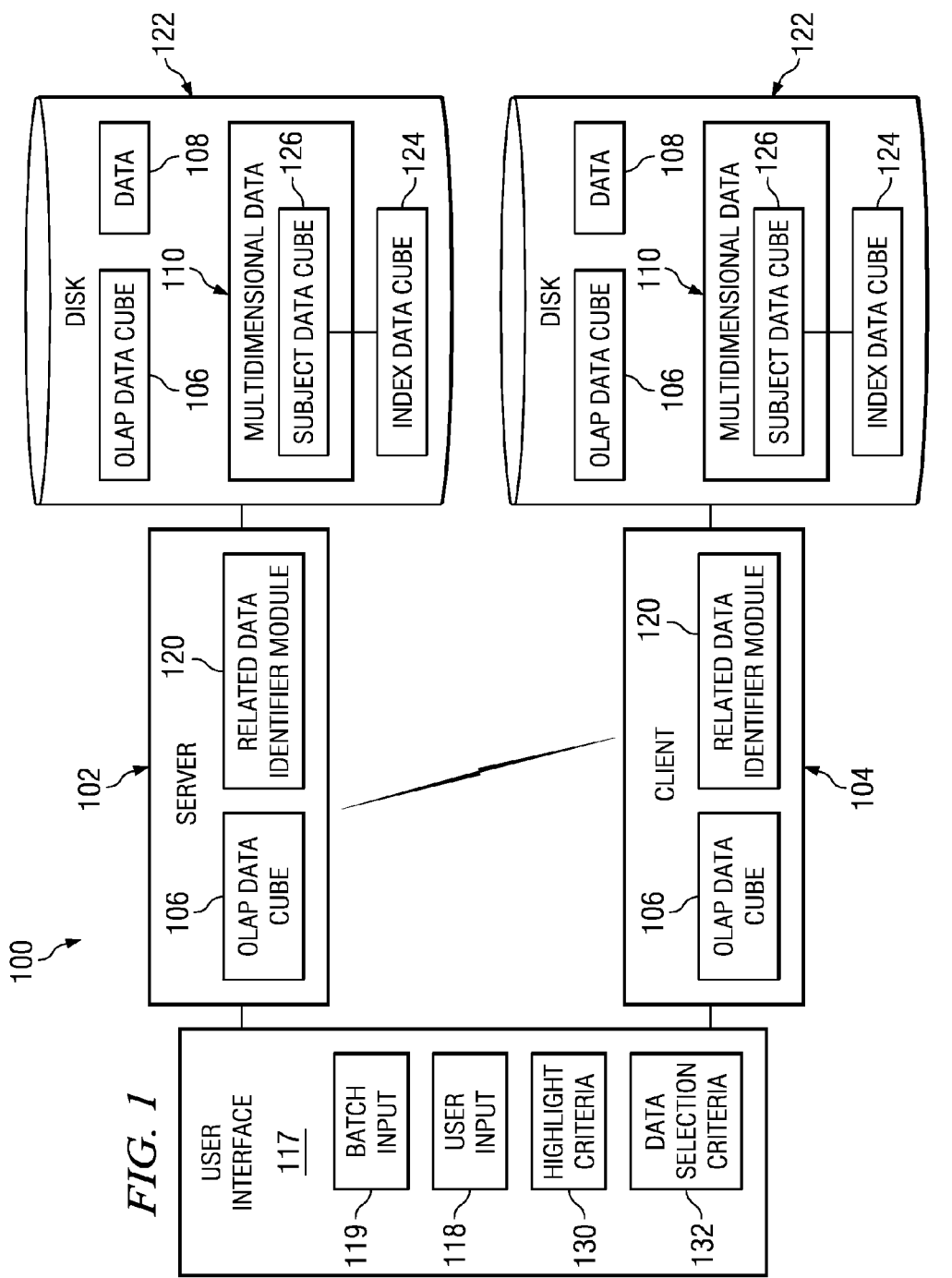

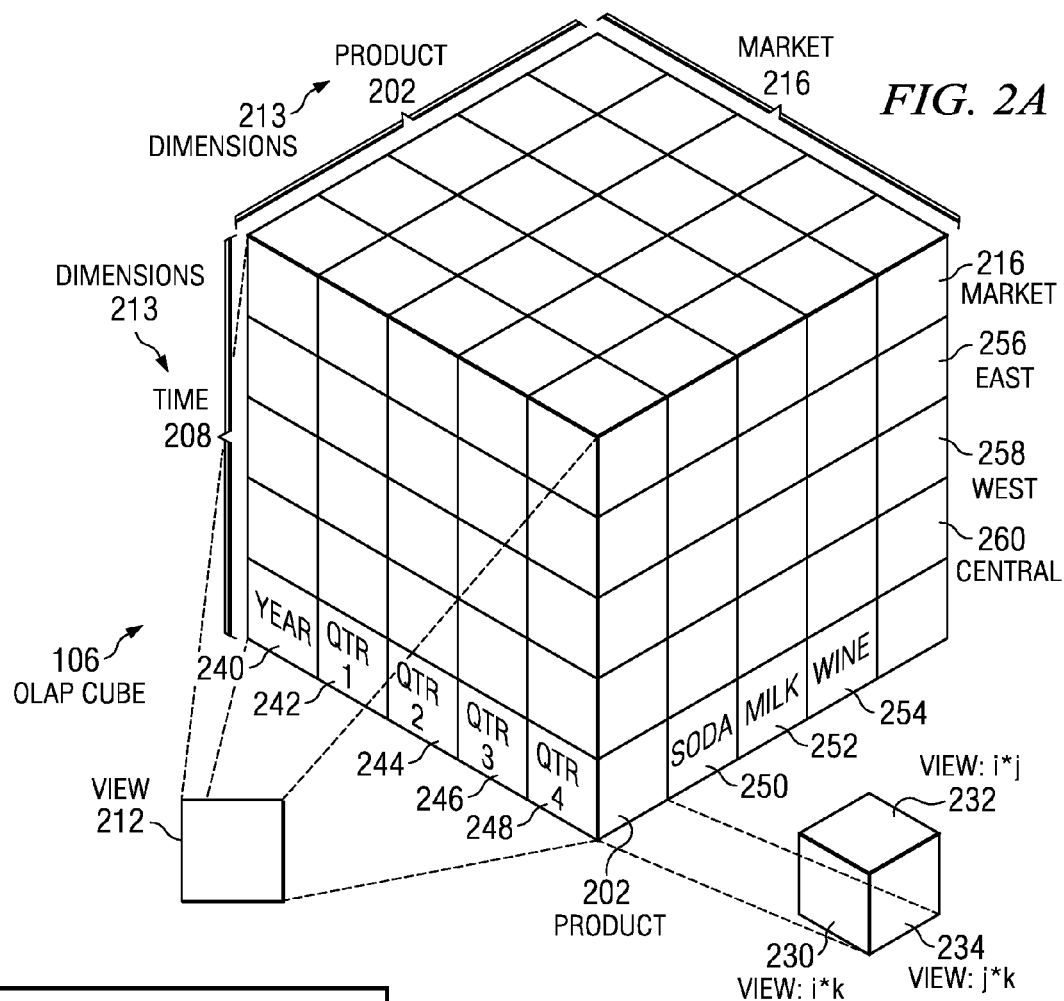

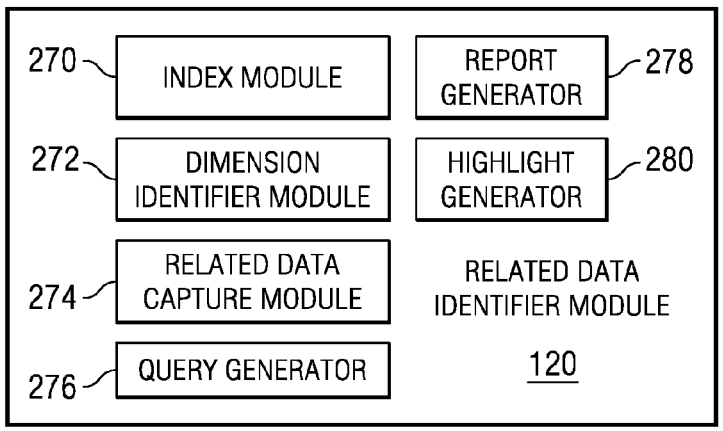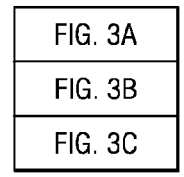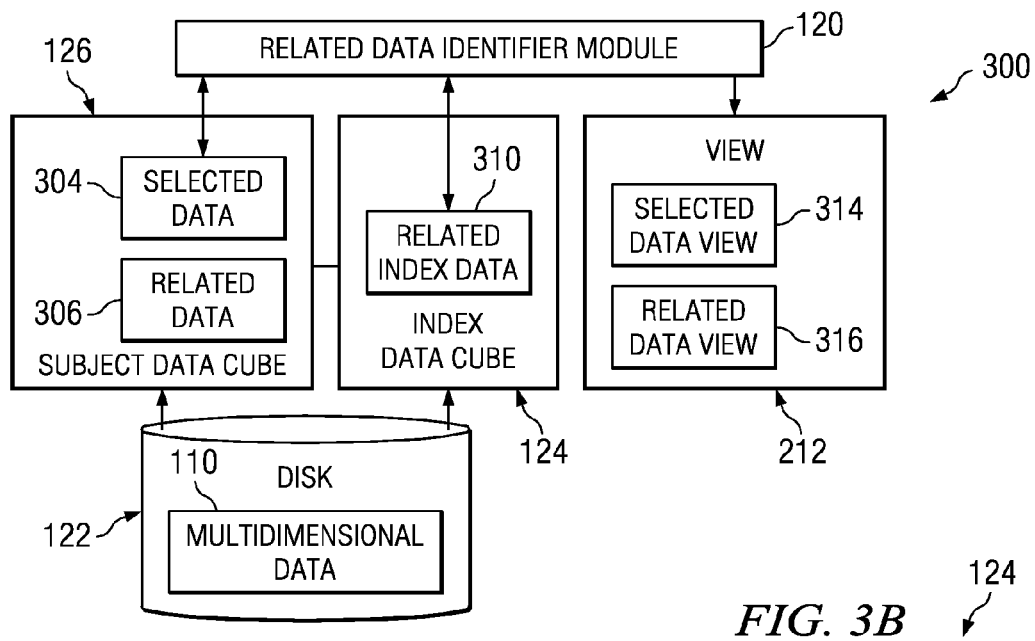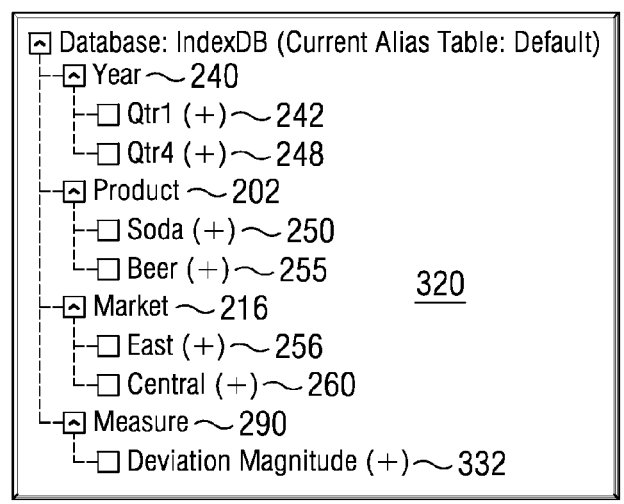

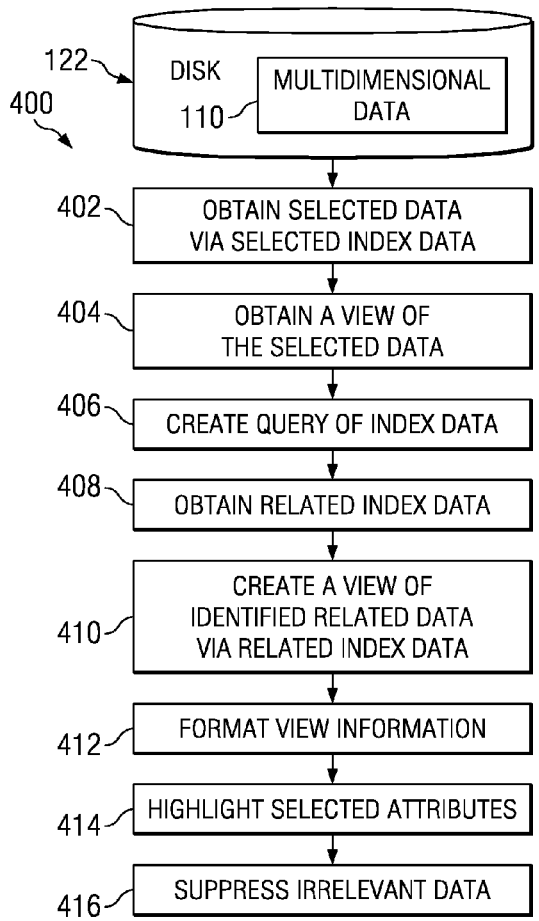

FIG. 4

- 122 DISK
- 110 MULTIDIMENSIONAL DATA
- 400
- 402 OBTAIN SELECTED DATA VIA SELECTED INDEX DATA
- 404 OBTAIN A VIEW OF THE SELECTED DATA
- 406 CREATE QUERY OF INDEX DATA
- 408 OBTAIN RELATED INDEX DATA
- 410 CREATE A VIEW OF IDENTIFIED RELATED DATA VIA RELATED INDEX DATA
- 412 FORMAT VIEW INFORMATION
- 414 HIGHLIGHT SELECTED ATTRIBUTES
- 416 SUPPRESS IRRELEVANT DATA

FIG. 3C

- 250 Line 1. {supmissingrows}
- 292 Line 2. Soda     340
- 344 Line 3. Sales
- 346 Line 4. <Row ("Year", "Market")
- 348 Line 5. <ONSAMELEVELAS Qrt1
- Line 6. <ONSAMELEVELAS East
- Line 7. !

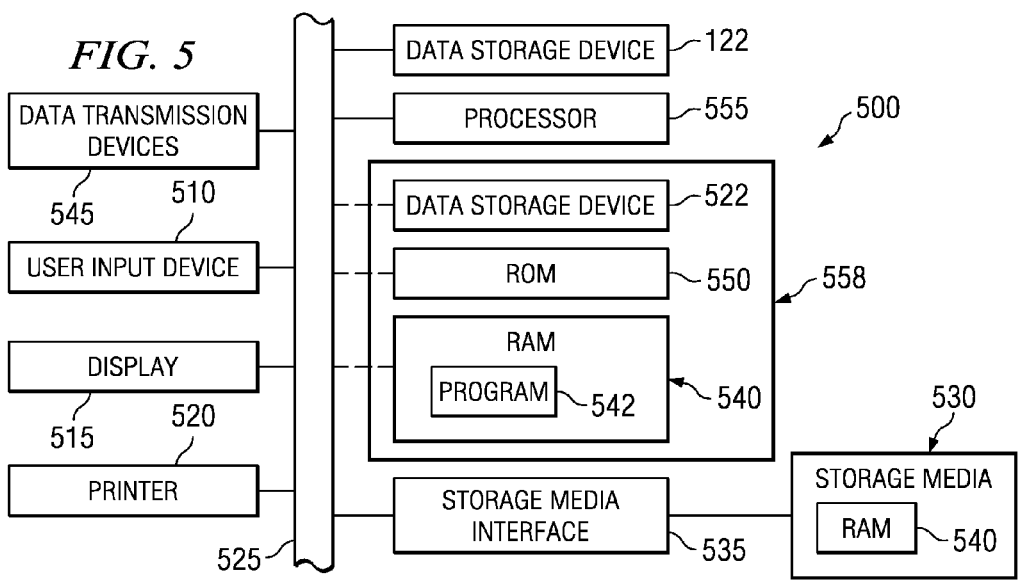

FIG. 5

SYSTEMS AND COMPUTER PROGRAM PRODUCTS TO IDENTIFY RELATED DATA IN A MULTIDIMENSIONAL DATABASE

CROSS-REFERENCE TO RELATED APPLICATIONS

This application is a continuation of and claims the benefit of U.S. Pat. No. 7,472,127 B2 "SYSTEMS, METHODS, AND COMPUTER PROGRAM PRODUCTS TO IDENTIFY RELATED DATA IN A MULTIDIMENSIONAL DATABASE", having U.S. application Ser. No. 10/325,299, filed Dec. 18, 2002, the entire contents of which is incorporated herein by reference.

In co-pending U.S. application Ser. No. 09/565,132 entitled "Navigating an Index to Access a Subject Multi-Dimensional Database," by William Earl Malloy et. al, assigned to the assignee of the present invention, and incorporated herein in its entirety by this reference, there is described a method, apparatus, and article of manufacture for using an index to access a subject multidimensional database. Although not limited thereto, the present invention employs such a method in one of its preferred embodiments. U.S. application Ser. No. 09/565,132 issued as U.S. Pat. No. 7,269,786 on Sep. 11, 2007.

In co-pending U.S. application Ser. No. 09/564,344 entitled "Using an Index to Access A Subject Multi-Dimensional Database," by William Earl Malloy et. al, assigned to the assignee of the present invention, and incorporated herein in its entirety by this reference, there is described a method, apparatus, and article of manufacture for using an index to access a subject multidimensional database. Although not limited thereto, the present invention employs such a method in one of its preferred embodiments. U.S. application Ser. No. 09/564,344 issued as U.S. Pat. No. 6,915,289 on Jul. 5, 2005, and a Statutory Disclaimer was filed for U.S. Pat. No. 6,915,289 on Jan. 10, 2007. U.S. Pat. No. 7,529,727, having U.S. application Ser. No. 09/747,515, entitled "Using an Index to Access A Subject Multi-Dimensional Database," by William Earl Malloy et. al, with U.S. Publication Number 2001/0054034, is a continuation of U.S. application Ser. No. 09/564,344, and is incorporated herein in its entirety by this reference.

In co-pending U.S. patent application Ser. No. 09/998,955, "Systems, Methods, and Computer Program Products to Interpret, Explain, and Manipulate Exceptions in Multidimensional Data," by Kelkar et al., assigned to the assignee of the present invention, there is described a method, apparatus, and article of manufacture for interpreting, explaining, and manipulating exceptions in multidimensional data on a computer system. Although not limited thereto, the present invention employs such a method in one of its preferred embodiments. U.S. application Ser. No. 09/998,955 issued as U.S. Pat. No. 6,654,764 on Nov. 25, 2003, and a Statutory Disclaimer was filed for U.S. Pat. No. 6,654,764 on Jan. 10, 2007.

BACKGROUND OF THE INVENTION

1. Field of the Invention

The present invention is directed to the field of computer-based multidimensional data modeling. It is more particularly directed to identifying data that is related to selected data in a multidimensional database on a computer system.

2. Description of the Background Art

On-Line Analytical Processing (OLAP) is a computing technique for summarizing, consolidating, viewing, analyzing, applying formulae to, and synthesizing data according to multiple dimensions. OLAP software enables users, such as analysts, managers, and executives, to gain insight into performance of an enterprise through rapid access to a wide variety of data "views" or "dimensions" that are organized to reflect the multidimensional nature of the enterprise performance data. An increasingly popular data model for OLAP applications is the multidimensional database (MDDB), which is also known as the "data cube." OLAP data cubes are often used by a data analyst for interactive exploration of performance data. New opportunities associated with the enterprise may be discovered by identifying relationships and associations in the data.

OLAP functionality is characterized by dynamic multidimensional analysis of data supporting end user analytical and navigational activities including: calculation and modeling applied across dimensions through hierarchies or across members, trend analysis over sequential time periods, slicing subsets for on-screen viewing of the multidimensional data, drill-down to deeper levels of consolidation of the multidimensional data, reach-through to underlying detail data, and rotation to new dimensional comparisons in the viewing area associated with the multidimensional data. It is frequently difficult to efficiently analyze multidimensional data due to the lack of referential information about the association of the data to other neighboring and possibly related multidimensional data.

A multidimensional OLAP system typically has multiple dimensions and may have members within each dimension. A member may be considered a name of a category used in multidimensional analysis. That is, a member may be a label associated with an edge that edge being a dimension in a multidimensional data cube. For example, "March" could be a member that identifies information that was stored relating to the month of March. Such a system that supports a multidimensional data cube is often very large, and it may be difficult to identify where the most interesting features are in a vast pool of data. More particularly it is often difficult and time consuming to identify and analyze the most interesting features when the relationship and association between the data in a multidimensional data cube is unclear.

In order to facilitate access of information in a data cube, an index that may be represented in an index data cube and that references data in the data cube may be generated. The index may be used to access selected information in a data cube more efficiently than access techniques that do not employ an index. Given an index that is used to access and select particular multidimensional data, it would be useful to present the context in which the selected multidimensional data is located as a representation of neighboring or associated multidimensional data.

From the foregoing it will be apparent that there is still a need to improve OLAP data analysis by determining the relationship between selected multidimensional data and neighboring or associated multidimensional data on a computer system. More particularly, existing systems have not been able to adequately and efficiently determine the relationship between neighboring or associated data that may be configured in a database and that is associated with selected multidimensional data.

SUMMARY OF THE INVENTION

An embodiment of the present invention relates to systems, methods, and computer products that identify data that are related to selected data in a database on a computer system. The present invention is related to the field of computer-based multidimensional data modeling often used by data analysts.

The present invention assists the data analyst by efficiently identifying and more clearly presenting data that is related to or associated with selected multidimensional data such as selected data that is discussed with reference to U.S. patent application Ser. No. 09/565,132, "Navigating an Index to Access a Subject Multi-Dimensional Database." Existing systems have not been able to efficiently and adequately identify data that is related to, or associated with, selected data in a multidimensional database.

The preferred embodiment of the present invention operates efficiently with an index that includes location and magnitude information about features in a subject multidimensional database. More particularly, selected data has been extracted from the subject multidimensional database and the preferred embodiment of the present invention uses a Related Data Identifier Module to access information in the index that is used to identify data that is related to and associated with the selected data. The overwhelming amount of data in a multidimensional database that may be viewed by a user, such as a data analyst, is efficiently and advantageously reduced, by the preferred embodiment of the present invention, to the selected and related data.

The preferred embodiment of the present invention operates on features of selected data that may be presented in a two-dimensional view or multi-dimensional view, and enhances the view with associated data that may be uniquely formatted. The associated data is related to the selected data along the dimensions of the view that are used to present the selected data. Further, the preferred embodiment of the present invention may identify the associated data as sibling data of the selected data. The sibling data is at the same level of aggregation in the subject multidimensional database as the selected data. The preferred embodiment of the present invention novelly accesses the selected data by using index data that is not necessarily at the same hierarchy level and the index data is not necessarily represented as a multidimensional database.

An embodiment of the present invention is achieved by systems, methods, and articles of manufacture that use an index that identifies data that is related to selected data in a multidimensional database on a computer system. The method of the preferred embodiment of the present invention comprises: (a) obtaining selected data, typically from a subject multidimensional database by the use of index data; (b) creating a view of the selected data; (c) creating a query that accesses the index data to obtain related index data; and (d) obtaining a view of the identified related data via the use of the related index data. Further the method may comprise: (e) creating a view of the related data; (f) formatting the view of the related data and the selected data for presentation to a user; and (g) highlighting attributes of the related data and the selected data in the view based on highlighting criteria. One embodiment of the present invention may also suppress information about the selected data in the subject database that is not interesting, such as empty data points. This enables the user to view related data without the inclusion of irrelevant data.

Other aspects and advantages of the present invention will become apparent from the following detailed description, taken in conjunction with the accompanying drawings, illustrating by way of example the principles of the invention.

BRIEF DESCRIPTION OF THE DRAWINGS

In the following detailed description and in the several figures of the drawings, like elements are identified with like reference numerals.

FIG. 1 is a block diagram that illustrates the present invention;

FIG. 2A is a block diagram of a multidimensional database, an OLAP data cube, that is suitably configured for operation with the present invention;

FIG. 2B is a block diagram that illustrates the conceptual structure of a subject multidimensional database;

FIG. 2C is a block diagram that illustrates the Related Data Identifier Module;

FIG. 3A is a block diagram that illustrates the operation of the Related Data Identifier Module;

FIG. 3B is a block diagram that illustrates the conceptual structure of an index multidimensional database;

FIG. 3C is a block diagram that illustrates a query used to determine related data;

FIG. 4 is a flow diagram that illustrates the method of the present invention; and FIG. 5 is a block diagram of a computer system suitably configured for employment of the present invention.

DESCRIPTION OF THE INVENTION

As shown in the drawings and for purposes of illustration, the preferred embodiment of the invention novelly identifies data that is related to and associated with data that has been selected from a multidimensional database. The overwhelming amount of data in a multidimensional database that may be viewed by a user, such as a data analyst, is reduced to the selected data that is presented along with multidimensional data that is related to and associated with selected data. According to the present invention, irrelevant data is filtered out and not presented to the user thereby providing a simplified view of the data for analysis. Existing systems have not been able to efficiently and adequately provide contextual information about selected data by identifying data that is related to and associated with selected data in a multidimensional database.

As shown in FIG. 1 and in element 100, the preferred embodiment of the present invention may operate in a client-server computer system configuration. It will be appreciated that other computer system environments may be used to practice the present invention and the described computer system environment should not be considered limiting. Therefore, a client computer system 104 may communicate with a server computer system 102 during the operation of the present invention. The related Data Identifier Module 120 operates in either the client 104 or the server 102 to perform the preferred embodiment of the present invention. For example, information may be communicated to either the server 102 or the client 104 via the user interface 117. Through such communication, data selection criteria 132 and data report highlight criteria 130 may be established and may subsequently be used by the Related Data Identifier Module 120 to manipulate data 108, such as multidimensional data 110. The user interface 117 may communicate with the preferred embodiment of the present invention, either via batch input 119 or user input 118.

Further, an OLAP data cube 106 may be configured in the memory 558 of either the client 104 or the server 102. Alternatively, the OLAP data cube 106 may be configured in computer storage such as a disk 122. Typically, the OLAP data cube 106 is configured in computer storage of a disk 122 associated with the server 102, and the client 104 typically accesses portions of the multidimensional data 110. The terms "OLAP data cube," "data cube," and "multidimensional database" will be used interchangeably herein. Element 558 is described with reference to FIG. 5.

The operation of the present invention uses a subject data cube 126 and an index data cube 124. The subject data cube 126 is the multidimensional database 110 that is the subject of analysis by the user. The index data cube 124 is used to access selected data 304 in the subject data cube 126. The index data cube 124 and the subject data cube 126 may be located in the memory 558 of a computer system 500 or on another computer media, such as the disk 122. The preferred embodiment of the present invention novelly uses a data cube 106 to represent the index data cube 124 so that a multidimensional query may be used to determine the data 108 that is related to and associated with the information in the subject data cube 126. Element 304 is described with reference to FIG. 3, and element 500 is described with reference to FIG. 5.

FIG. 2 includes FIG. 2A, FIG. 2B, and FIG. 2C. As shown in FIG. 2A, an OLAP data cube 106 is suitably configured for operation with the present invention. Therefore, by means of explanation, an example of the operation of the present invention is described. The view 212 that may be represented as a row or column may be included in an OLAP data cube 106, and is organized to reflect the multidimensional nature of the enterprise performance data 108. In the present invention views 212, particularly two-dimensional views 212 that are used to view selected data 304 in context, are generated by selecting pairs of dimensions 213 from the subject data cube 126 and slicing the subject data cube 126 along those dimensions 213 so that the data point from the subject data cube 126 is included in the slice. For example, in the present example the three dimensions 213 are included in planes that are sliced by either a row or a column and create the following views 212: view i*j, as shown in element 232, view i*k, as shown in element 230, and view j*k, as shown in element 234. Elements 106, 108, and 126 are described with reference to FIG. 1, and element 304 is described with reference to FIG. 3.

Further, a dimension is a set or collection of related categorical elements, as defined by an analytic model. For example, all time periods in a fiscal calendar (including defined groups of periods such as weeks, months, quarters, and years) might form a Time Dimension 208. In the same way all product identifiers (including groups of products) might form a Product Dimension 202. Herein the Market Dimension 216 may be used to identify all product markets, such as East 256, West 258, and Central 260.

A multidimensional data cube 106 typically includes data 108 in a hierarchical structure that may be represented as aggregated levels. In the present example, the actual name of the Time dimension 208 is Year 240. The Year dimension 240 may be decomposed into levels. In the present example the Time dimension 208 includes a quarter level with: Qtr 1, as shown in element 242, Qtr 2, as shown in element 244, Qtr 3, as shown in element 246, and Qtr 4, as shown in element 248 that are siblings with respect to the hierarchical structure represented. The Product dimension 202 may be decomposed into information about the following products: Soda 250, Milk 252, and Wine 254.

FIG. 2B is a block diagram that illustrates the conceptual structure of a subject multidimensional database 126. Therefore, by means of example the subject multidimensional database 126 includes information about the Year 240, Products 202, and Market 216. The information may be organized in a hierarchical fashion. Therefore the information about a Year 240 may include information about quarters such as: Qtr 1 as shown in element 242, Qtr 2 as shown in element 244, Qtr 3 as shown in element 246, and Qtr 4 as shown in element 248. Information at the same hierarchy level may also be presented for Product data 202 and Market data 216. The Product data 202 may include information about: Soda 250, Milk 252, Wine 254, and Beer 255. The Market information 216 may include information about: the East 256 market, the West 258 market, and the Central 260 market. The subject database 126 often includes a Measures Dimension 290 that enumerates the quantities that are stored in the multidimensional database 110, such as Profit, Income, Expense, and Inventory. In the present example, the Measures Dimension 290 has a single member, Sales 292.

As shown in FIG. 2C, the Related Data Identifier Module 120 includes elements used in the preferred embodiment of the present invention. The Related Data Identifier Module 120 is typically program code that may be embodied as a computer program 542 (as shown in FIG. 5), and by means of example an embodiment of the Related Data Identifier Module 120 is described in U.S. patent application Ser. No. 09/565,132, "Navigating an Index to Access a Subject Multi-Dimensional Database." The Index Module 270 is used by an embodiment of the present invention to determine an index that is used to access the subject data cube 126. The preferred embodiment of the present invention creates the index data cube 124 that is used to access the subject data cube 126. Elements 124 and 126 are described with reference to FIG. 1.

The Dimension Identifier Module 272 is used to identify selected data 304 that is represented as dimensions 213 for a preferred projection of multidimensional data 110, such as is described in U.S. patent application Ser. No. 09/998,955, "Systems, Methods, and Computer Program Products To Interpret, Explain, and Manipulate Exceptions in Multidimensional Data." The related Data Capture Module 274 is used to access the index data cube 124 and identify related data 306 that is associated with the selected data 304 by use of the related index data 310. The Query Generator 276 is used to generate a query that is executed against the index data cube 124 to determine the related index data 310. The Report Generator 278 is used to generate a report of the selected data 304 and the related data 306. Such a report is shown in Table 6 herein. Further, the Highlight Generator 280 is used to highlight certain attributes of the selected data 304 and related data 306 that meet highlight criteria 130. Elements 110 and 130 are described with reference to FIG. 1, element 213 is described with reference to FIG. 2A, and elements 304, 306, and 310 are described with reference to FIG. 3.

FIG. 3 includes FIG. 3A, FIG. 3B, and FIG. 3C. FIG. 3A, as shown in element 300, illustrates the novel operation of the Related Data Identifier Module 120. The Related Data Identifier Module 120 obtains selected data 304 from a subject data cube 126. The subject data cube 126 is created from multidimensional data 110 that is typically stored on a disk 122. Element 212 is described with reference to FIG. 2.

The Related Data Identifier Module 120 novelly operates according to the present invention by performing multidimensional queries on the index data cube 124 in order to identify related index data 310. Since the index data cube 124 is typically sparse, identifying related index data 310 by the use of multidimensional queries is an efficient way of identifying, in a single operation, all selected data 304 in a given view 212 of the subject data cube 126 that is referenced by the index data 124. Therefore, and in the preferred embodiment of the present invention, the index data cube 124 is represented as a multidimensional cube 106 so that the multidimensional queries directed to the index data cube 124 may be performed efficiently. Further, the members of identified selected data 304 determine the predicate or predicates of the multidimensional queries. Therefore, the Related Data Identifier Module 120 may novelly identify related data 306 that is associated with the selected data 304 by use of multidimensional queries directed to the related index data 310. Further the selected data 304 and the related data 306 may be presented to the user in a view 212, such as a selected data view 314 and a related data view 316.

FIG. 3B, as shown in element 124, illustrates the conceptual structure of the index data cube 124. In one embodiment of the present invention, a system is based on the product marketed under the trademark Hyperion® Essbase® OLAP software. The present invention utilizes a number of components from the Essbase® OLAP system, including the outline illustrated herein. However, since the present invention comprises new elements that enable identification of related data 306 that is associated with selected data 304 that has been selected from a multidimensional database 110, those skilled in the art will recognize that the present invention may be practiced without components based on Hyperion® Essbase® OLAP software. For example, there are a number of multidimensional systems that use Multidimensional Expressions (MDX) as their query language. Element 110 is described with reference to FIG. 1, and elements 304 and 306 are described with reference to FIG. 3A.

In the present example, the multidimensional structure of the index data cube 124 may be represented as an outline, as shown in element 320. The Measures Dimension 290 has only a single member, Deviation Magnitude 332. The index data cube 124 identifies cells that fall within particular thresholds that are applied to the data in the subject database 126. Further, as shown in Table 1, the present example of the index data cube 124 includes information about the values of Sales 292 having Deviation Magnitudes 332 at or above eight. Therefore in the present example the Products 202 shown are: Soda as shown in element 250, and Beer as shown in element 255. The Deviation Magnitudes 332 shown in Table 1 represent the deviations from the mean for the identified Sales 292 figures and serve to standardize the information that is presented. Element 126 is described with reference to FIG. 1, and element 272 is described with reference to FIG. 2.

It will be appreciated by those skilled in the art that there are many methods of calculating a deviation magnitude 332 associated with data 108 in the multidimensional data cube 110. Such a method is described in U.S. Pat. No. 6,094,651, "Discovery-Driven Exploration of OLAP Data Cubes." Other index data cubes 124 in the present example that are associated with the Market data 214 are East as shown in element 256 and Central as shown in element 260. Element 108 is described with reference to FIG. 1.

TABLE 1

Index Data:

| Measure | Year | Product | Market | Deviation Magnitude |
|---------|------|---------|--------|---------------------|
| Sales | Qtr 1 | Soda | East | 11 |
| Sales | Qtr 1 | Soda | Central | 9 |
| Sales | Qtr 4 | Soda | Central | 9 |
| Sales | Qtr 1 | Beer | Central | 9 |
| Sales | Qtr 4 | Beer | East | 8 |

Given the index data cube 124 illustrated in FIG. 3B, further information about a particular row may be obtained by operation of the present invention. For example, the feature shown in Table 2, is an example of related index data 310 that is discussed with reference to FIG. 3A. Therefore in this example, the related index data 310 of Table 2 may drive the operation of the present invention.

TABLE 2

Related Index Data:

| Measure | Year | Product | Market | Deviation Magnitude |
|---------|------|---------|--------|---------------------|
| Sales | Qtr 1 | Soda | East | 11 |

As shown in Table 3, subject data 304 is used to present related data 306 that is located by use of information in the related index 310. Therefore, as shown in Table 3, Sales 292 data about Soda 250 in all Markets 216 and for all quarters in the Year 240 is described.

TABLE 3

Related Data - Sales Figures:

| Sales | Soda East | West | Central |
|-------|-----------|------|---------|
| Qtr 1 | −9.32 | 1.20 | 20.6 |
| Qtr 2 | 1.34 | 1.32 | 1.56 |
| Qtr 3 | 1.60 | 1.34 | 1.21 |
| Qtr 4 | 1.81 | 1.10 | 30.4 |

Continuing with the current example, the information associated with three entries in Table 3 falls within a threshold, such as highlight criteria 130, that may be set by the user. It may be understood that the highlight criteria 130 enables the user or an administrator to constrain the points that are highlighted for any purpose, such as security or specialized analysis. Therefore, since the data shown in Table 4 falls within a threshold it represents related data 306 with Sales 292 figures of interest. The fact that the data for East 256 in Qtr 1 242 falls within the identified threshold is not a surprise because the view of data in Table 3 was driven by the selection of the index entry shown in Table 3. However, with very large subject data cubes 126 and complex methods for determining which features to include in the index data cube 124, it may not be apparent that the Sales 292 figures in the last two rows of Table 4 also fall within the identified threshold specified in the creation of the index data cube 124. Element 130 is described with reference to FIG. 1.

TABLE 4

Significant Sales Figures:

| Sales | Qtr 1 | Soda | East | −9.32 |
| Sales | Qtr 1 | Soda | Central | 20.6 |
| Sales | Qtr 4 | Soda | Central | 30.4 |

Now, as shown in FIG. 3C and element 340, a query of the index data cube 124 is performed according to the preferred embodiment of the present invention. The Essbase® report script language query is shown in FIG. 3C. However, it will be appreciated by those skilled in the art that the present invention may be practiced with components based on multidimensional software other than Hyperion® Essbase® OLAP software. The example query fixes on non-expanded members of the related data 306, namely Soda 250 and Sales 392, as shown in lines 2 and 3. The other two dimensions 213, Year 240 and Market 216 are chosen to generate the view 212 and as shown in element 344 the report script declares these two dimensions 213 as row labels in line 4. The present example shows that a dimension 213 is novelly used by the present invention to create a representation of selected data 304 and related data 306. For each selected dimension 213, a representative set of siblings (members of the same level) of the member that identifies the selected data 304 within that dimension 213, are used to retrieve related data 306. By means of further explanation, the related data 306 are retrieved by accessing combinations of members that are at the same level of aggregation, in the hierarchies of the Subject Data Cube 126 as the Selected Data 304. For example sibling members include Qtr 4 as shown in element 248, and Central as shown in element 260, respectively. In the present example, the sibling members are obtained by use of the directives shown in elements 346 and 348, and are further shown with reference to Table 6. Since the index data cube 124 contains only indexed features of the subject database 126 the result is highly sparse and the query operation is highly efficient. The query 340 result of the search of the index data cube 124, the related index data 310, is shown in Table 5. Notice that the data points that are not interesting, such as empty data points, have been suppressed in the reporting of the indexed features of the subject database 126. Elements 110, 124, and 126 are described with reference to FIG. 1; elements 202, 204, 212, 213, 216, 234, 240, 248 and 250 are described with reference to FIG. 2; elements 304, 306, and 310 are described with reference to FIG. 3A; and element 340 is described with reference to FIG. 3C.

TABLE 5

Query Result:

| Soda | Sales | Qtr 1 | East    | 11 |
| Soda | Sales | Qtr 1 | Central | 9  |
| Soda | Sales | Qtr 4 | Central | 9  |

The view 212 of the subject database 126 is now augmented by the preferred embodiment of the present invention by highlighting the features identified by the query. The resulting view 212 of the subject database 126 shows the selected data 304 in context with other multidimensional data 110 at the same level of aggregation. Further, related data 306 are identified by use of the related index data 310 and in the present example the related data 306 in the related data view 316 are shown in bold format. The selected data point 304 is shown within a selected data view 314 in both bold and underlined format. Therefore, the selected data 304 and the related data 306 may be formatted and presented to the user in one highlighted view 212, as shown in Table 6. While the present example has included two-dimensional views 212, the operation of the present invention is not limited to two-dimensional views 212 and may operate with multi-dimensional views 212. Elements 314 and 316 are described with reference to FIG. 3A

TABLE 6

Highlighted View:

| Sales | Soda East | West | Central |
|-------|-----------|------|---------|
| Qtr 1 | −9.32     | 1.20 | 20.6    |
| Qtr 2 | 1.34      | 1.32 | 1.56    |
| Qtr 3 | 1.60      | 1.34 | 1.21    |
| Qtr 4 | 1.81      | 1.10 | 30.4    |

FIG. 4 and element 400 illustrate the preferred method of the present invention that identifies data that are related to selected data 304 in a multidimensional database 110 on a computer system 500. The method of the preferred embodiment of the present invention comprises obtaining selected data 304, typically from a subject multidimensional database 126, as shown in element 402. The selected data 304 is obtained via the use of the index data cube 124. As shown in element 404, a view of the selected data 314 is obtained. A query of the index data cube 124 is created, as shown in element 406, and as shown in element 408, the query accesses the index data cube 124 to obtain related index data 310. As shown in element 410, a view of the identified related data 316 is obtained via the use of the related index data 310. Elements 124 and 126 are described with reference to FIG. 1, elements 304, 306, 310, 314, and 316 are described with reference to FIG. 3, and element 500 is are described with reference to FIG. 5.

Further, the view of the related data 316 and the selected data 314 may be formatted for presentation to a user, as shown in element 412. The attributes of the related data 306 and the selected data 304 that meet the threshold set by highlight criteria 130 may be highlighted, as shown in element 414. As shown in element 416, the preferred embodiment of the present invention may also suppress irrelevant data 108 that exists in the subject database 126 that might otherwise be included as part of a view 212 showing selected data 304 in context. Elements 108 and 130 are described with reference to FIG. 1, and element 212 is described with reference to FIG. 2.

FIG. 5 is a block diagram of a computer system 500, suitable for employment of the present invention. System 500 may be implemented on a general-purpose microcomputer, such as one of the members of the IBM Personal Computer family, or other conventional workstation or graphics computer devices, or mainframe computers. In its preferred embodiment, system 500 includes a user input device 510, a display 515, a printer 520, a processor 555, a read only memory (ROM) 550, a data storage device 122, such as a hard drive, a random access memory (RAM) 540, and a storage media interface 535, all of which are coupled to a bus 525 or other communication means for communicating information. Although system 500 is represented herein as a standalone system, it is not limited to such, but instead can be part of a networked system. For example, the computer system 500 may be connected locally or remotely to fixed or removable data storage devices 122 and data transmission devices 545. Further, the computer system 500, such as the server computer system 102 and the client computer system 104, also could be connected to other computer systems 500 via the data transmission devices 545. Elements 102 and 104 are described with reference to FIG. 1.

The RAM 540, the data storage device 122, and the ROM 550, are memory components 558 that store data 108 and instructions for controlling the operation of processor 555, which may be configured as a single processor or as a plurality of processors. The processor 555 executes a program 542 to perform the methods of the present invention, as described herein. Element 108 is described with reference to FIG. 1.

While the program 542 is indicated as loaded into the RAM 540, it may be configured on a storage media 530 for subsequent loading into the data storage device 122, the ROM 550, or the RAM 540 via an appropriate storage media interface 535. Storage media 530 can be any conventional storage media such as a magnetic tape, an optical storage media, a compact disk, or a floppy disk. Alternatively, storage media 530 can be a random access memory 540, or other type of electronic storage, located on a remote storage system.

Generally, the computer programs and operating systems are all tangibly embodied in a computer-readable device or media, such as the memory 558, the data storage device 122, or the data transmission device 545, thereby making an article of manufacture, such as a computer program product, according to the invention. As such, the terms "computer program product" as used herein are intended to encompass a computer program 542 accessible from any computer readable device or media.

Moreover, the computer programs 542 and operating systems are comprised of instructions which, when read and executed by the computer system 500, such as the server computer system 102 and the client computer system 104, cause the computer system 500, such as the server computer system 102 and the client computer system 104, to perform the steps necessary to implement and use the present invention. Under control of the operating system, the computer programs 542 may be loaded from the memory 558, the data storage device 122, or the data transmission devices 545 into the memories 558 of the computer system 500, such as the server computer system 102 and the client computer system 104, for use during actual operations. Those skilled in the art will recognize many modifications may be made to this configuration without departing from the scope of the present invention. Elements 102 and 104 are described with reference to FIG. 1.

The user input device 510, such as a keyboard or speech recognition subsystem, enables a user to communicate information and command selections to the processor 555. The user can observe information generated by the system 500 via the display 515 or the printer 520. The user input device 510 may also be a device such as a mouse, track-ball, or joy-stick, which allows the user to manipulate a cursor on the display 515 for communicating additional information and command selections to the processor 555.

When operating in accordance with one embodiment of the present invention, the system 500 identifies data 108 that is related to and associated with data 108 that has been selected from a multidimensional database 110, by the use of an index that includes location and magnitude information about features in a subject multidimensional database. The processor 555 and the program 542 collectively operate as a module for identification of data 108 that is related to and associated with data 108 that has been selected from a multidimensional data 110 by the use of an index. The overwhelming amount of data 108 in a multidimensional database 110 is efficiently and advantageously reduced by the preferred embodiment of the present invention to the selected and related data. It will be appreciated that the present invention offers many advantages over prior art techniques. Elements 108 and 110 are described with reference to FIG. 1.

The present invention is typically implemented using one or more computer programs 542, each of which executes under the control of an operating system and causes the computer system 500, such as the server computer system 102 and the client computer system 104, to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications can be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims Trademarks IBM is a trademark or registered trademark of International Business machines, Corporation in the United States and other countries.

Essbase and Hyperion are trademarks or registered trademarks of Hyperion Solutions Corporation.

What is claimed is:

1. A computer system for identifying related data that is associated with selected data said selected data that is implemented in a subject multidimensional database, said selected data being obtained by use of index data that is implemented in an index multidimensional database that is a data cube, comprising:
   related index data that is identified from said index data by creating a multidimensional query and executing said multidimensional query against said index data, wherein said multidimensional query includes one or more predicates determined by members of said selected data;
   said related data that is identified from said selected data by use of multidimensional queries directed to said related index data, wherein said related data is related to said selected data along dimensions of a view that is used to present said selected data to a user, and wherein identifying said related data includes retrieving said related data by accessing combinations of members that are at a same level of aggregation as members of said selected data;
   said view of said selected data that is formatted for presentation to a user by:
      determining highlighting criteria for said selected data; and
      highlighting said selected data in said view that is used to present said selected data based on said highlighting criteria;
   a view of said related data that is formatted for presentation to a user by:
      determining highlighting criteria for said related data; and
      highlighting said related data in said view that is used to present said related data to a user based on said highlighting criteria; and
   said related data and said selected data presented to a user in one highlighted view.

2. The computer system of claim 1, further comprising:
   said view of said selected data that is created;
   said multidimensional query that is created by use of said view of selected data; and
   said related data that is identified by said multidimensional query that is directed to said index multidimensional database.

3. The computer system of claim 1, further comprising a view of said related data that is created.

4. An article of manufacture comprising a computer-readable device storing instructions for identifying related data that is associated with selected data, said selected data that is implemented in a subject multidimensional database, said selected data being obtained by use of index data that is implemented in an index multidimensional database that is a data cube, wherein the instructions, when executed by a processor of a computer system, perform:
   identifying related index data from said index data by creating a multidimensional query and executing said multidimensional query against said index data, wherein said multidimensional query includes one or more predicates determined by members of said selected data;

identifying said related data from said selected data by use of multidimensional queries directed to said related index data, wherein said related data is related to said selected data along dimensions of a view that is used to present said selected data to a user, and wherein identifying said related data includes retrieving said related data by accessing combinations of members that are at a same level of aggregation as members of said selected data;

formatting said view of said selected data for presentation to a user by:
  determining highlighting criteria for said selected data;
  highlighting said selected data in said view that is used to present said selected data based on said highlighting criteria;

formatting a view of said related data for presentation to a user by:
  determining highlighting criteria for said related data; and
  highlighting said related data in said view that is used to present said related data to a user based on said highlighting criteria; and presenting said related data and said selected data to a user in one highlighted view.

5. The article of manufacture of claim 4, further comprising:
  creating said view of said selected data;
  creating said multidimensional query by use of said view of selected data; and
  identifying said related data by said multidimensional query that is directed to said index multidimensional database.

6. The article of manufacture of claim 4, further comprising creating a view of said related data.

\* \* \* \* \*